United States Patent [19]

Liddiard

[11] 4,419,015
[45] Dec. 6, 1983

[54] AGITATOR HAVING DETACHABLE WEAR SLEEVE

[75] Inventor: Roy Liddiard, Willowdale, Canada

[73] Assignee: General Signal Corporation, Stamford, Conn.

[21] Appl. No.: 235,823

[22] Filed: Feb. 19, 1981

[51] Int. Cl.³ .............................................. B01F 15/00
[52] U.S. Cl. ..................................... 366/349; 277/9.5; 277/102
[58] Field of Search ............... 366/241, 249, 261, 281, 366/284, 286, 331, 305, 342, 343, 282, 279, 330, 349; 277/9, 9.5, 102, 105, 64

[56] References Cited

U.S. PATENT DOCUMENTS

| | | | |
|---|---|---|---|
| 732,291 | 6/1903 | Fredericks | 277/102 |
| 2,929,646 | 3/1960 | Smith | 277/64 |
| 3,166,330 | 1/1965 | Boutros | 277/8 |

FOREIGN PATENT DOCUMENTS

| | | | |
|---|---|---|---|
| 18100 | of 1903 | United Kingdom | 277/102 |
| 500408 | 5/1976 | U.S.S.R. | 277/102 |

*Primary Examiner*—Philip R. Coe
*Assistant Examiner*—Joseph M. Pitko
*Attorney, Agent, or Firm*—Jeffrey S. Mednick; Harold S. Wynn

[57] ABSTRACT

An agitator has a shaft carrying a wear sleeve detachable secured thereon and extending through a fixed flange. A detachable stuffing box is secured to a first side of the flange, and an axially operable element of a valve is secured to the shaft on the opposite side of the flange. The sleeve is threaded into the valve element so that it can be replaced from the first side of the flange, and the valve is axially operable by longitudinal movement of the shaft to seal a shaft opening in the flange during replacement of the sleeve.

4 Claims, 3 Drawing Figures

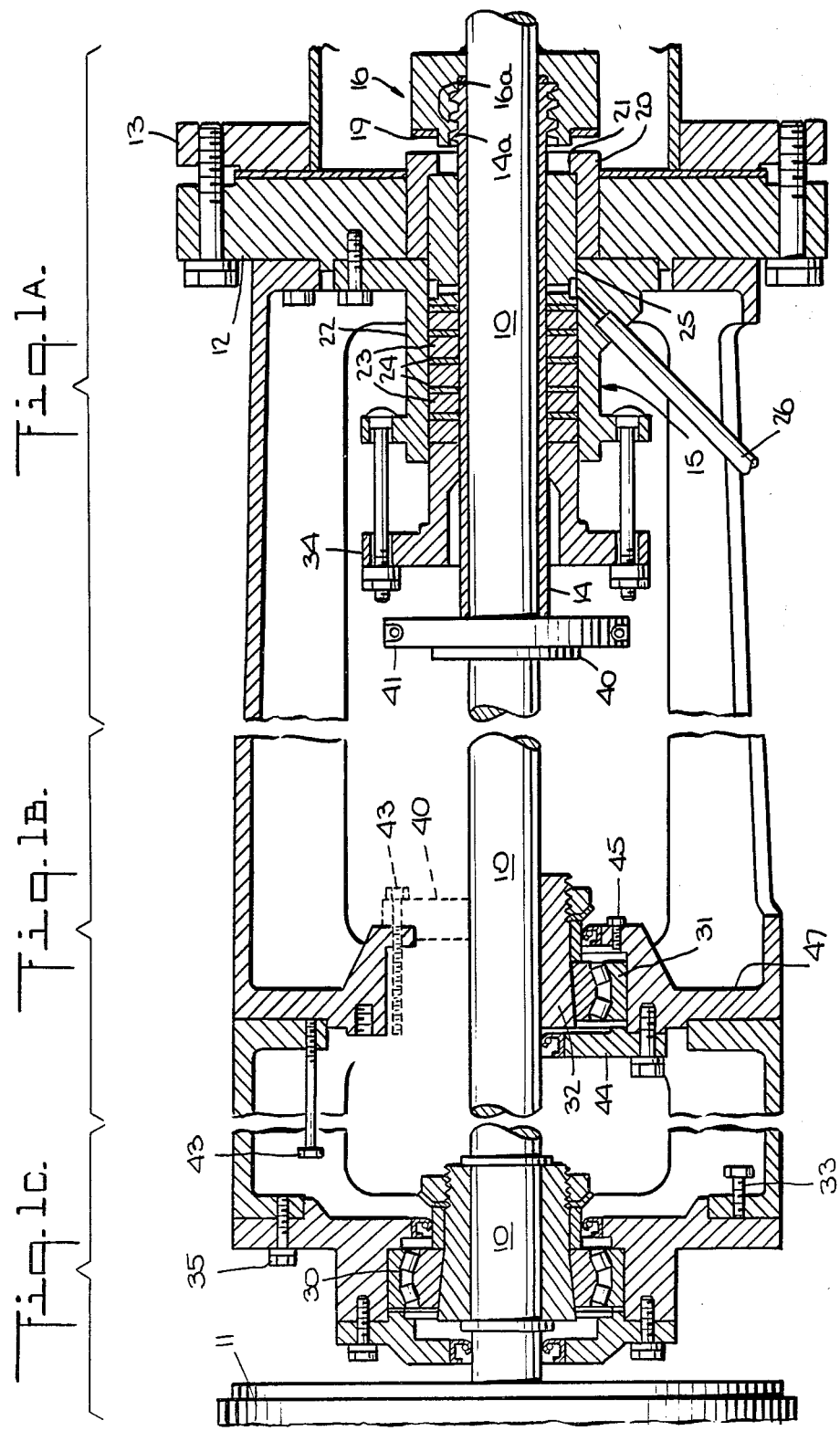

AGITATOR HAVING DETACHABLE WEAR SLEEVE

REFERENCE TO PRIOR CASES

This invention is related to prior patents assigned to the same assignee as the present application of BOUTROS U.S. Pat. Nos. 2,612,391; 2,911,240; 3,166,330, BISSELL U.S. Pat. No. 2,137,328, and DYKMAN U.S. Pat. No. 2,945,711, which are in part incorporated herein by reference.

BACKGROUND OF THE INVENTION

This invention relates to agitators for mixing tanks and the like, and while the invention is subject to a wide range of applications, a preferred embodiment of the invention will be particularly described as applied to an agitator having a detachable wear sleeve secured on its shaft.

In the use of agitators in mixing tanks, and the like, an impeller is projected into the tank, having its operating shaft, motor, and bearings external of the tank and sealed from the tank contents by a mounting flange, in combination with shaft sealing means such as a stuffing box, and the like. Various systems have been devised for service of the agitator bearings and stuffing box, including the use of a valve operable to seal the agitator shaft temporarily during such servicing operations to prevent the escapement of fluid around the agitator shaft from the tank under these conditions, and thus obviate any necessity of interfering with processes involving the contents of the tank during servicing operations. One such valve is disclosed in the DYKMAN U.S. Pat. No. 2,945,711, while a system for replacement of the bearings and of the packing of a stuffing box around the shaft is disclosed, for example, in the BOUTROS U.S. Pat. No. 2,612,391. In this patent, a stuffing box contains packing rings bearing directly upon an agitator shaft. The rings thus have a tendency to wear the shaft in time, providing possibility of leakage unless the shaft is replaced. Such replacement is costly, and may require a costly shutdown of a system in which the agitator is used. The replacement of the entire shaft can be avoided by using a wear sleeve secured on the shaft, as is disclosed in the BISSELL U.S. Pat. No. 2,137,328, but the system according to this patent requires removal of a pin inside the tank which locks the sleeve to the shaft. Thus the sleeve according to this patent could not be changed without performing operations within the tank, thus requiring a shut down of a system in which the agitator is operating.

An object of the present invention is to provide an agitator which substantially obviates one or more of the limitations and disadvantages of the described prior art systems.

Another object of the present invention is to provide an improved system for replacement of a wear sleeve on an agitator shaft.

Another object of the present invention is to provide an improved agitator assembly which materially reduces the cost of servicing.

Other objects, purposes and characteristic features of the present invention will be in part obvious from the accompaning drawings, and in part pointed out as the description of the invention progresses.

SUMMARY OF THE INVENTION

An agitator is provided of the well known type having a motor for driving a shaft extending through a mounting flange and having an impeller within a container such as a tank. This can be, for example, a paper stock agitator. The shaft carries a wear sleeve on the drive shaft, extending through a stuffing box at a first side of the mounting flange, and a valve is secured to the shaft on the other side of the mounting flange for preventing passage of fluid into the stuffing box when the stuffing box is being serviced.

The valve is adapted to detachably receive one end of the wear sleeve, and the wear sleeve is adapted to be removed from the shaft solely by operations from the first side of the mounting flange.

The wear sleeve is made quickly detachable from the valve from the first side of the mounting flange by having external threads cooperating with internal threads of the valve on the other side of the mounting flange.

For a better understanding of the present invention, together with other and further objects thereof, reference is had to the following description, taken in connection with the accompanying drawing, while its scope will be pointed out in the appending claims.

IN THE DRAWINGS

FIGS. 1A, 1B, and 1C, when placed one above the other respectively comprise an elevational view, partly in cross section, of a drive assembly for an actuator according to a preferred embodiment of the present invention.

With reference to FIGS. 1A, 1B, and 1C, an agitator shaft 10 is driven by a motor (not shown) through a pulley 11, the shaft 10 extending through a mounting flange 12 into a container 13 for driving an impeller (not shown). The shaft 10 carries a wear sleeve 14 extending through a stuffing box 15 secured above the flange 12. The shaft 10 has secured thereto on the lower side of the flange 12 a valve element 16 for preventing passage of fluids into the stuffing box 15 when the stuffing box 15 is being serviced.

The valve element 16 is adapted to detachably receive the lower end of the wear sleeve 14, and the wear sleeve 14 is adapted to be removed from the shaft 10 solely by operations from above the flange 12.

The wear sleeve 14 is made quickly detachable from the valve element 16 from the upper side of the mounting flange 12 by having external threads 14a that are left handed acme threads, at its lower end cooperating with internal threads 16a of the valve element 16 on the lower side of the mounting flange 12. The valve element 16 is secured by screws 17 to a flange 18 which is in turn suitably secured, as by welding, to the shaft 10. The upper face of valve element 16 has a suitable gasket 19 secured thereto opposite a valve seat 20 that is illustrated as a cup shaped insert secured in a bore through the mounting flange 12. The valve seat 20 has a bore 21 therein large enough to permit passage of the external threads 14a of the sleeve 14 through the bore 21. The valve element 16 has an upper recessed portion 16b that fits within the bore 21 when the shaft 10 is raised to press gasket 19 against the seat 20. This provides an inboard support for shaft 10 while the sleeve 14 is being replaced.

The stuffing box 15 comprises a cylindrical housing 22 detachably secured to the upper side of the mounting flange 12 for containing suitable packing rings 23 and packing separators 24 for sealing the wear sleeve 14 against fluid leakage from a lower washing portion partly within the stuffing box and partly within the cup 20 containing a throttle bushing 25 through which fluid is flushed at a metered rate from an entrance pipe 26. The wash water enters the tank through the bore 21 in the cup shaped sleeve 20 and keeps the valve gasket 19 clean while maintaining a pressure in the stuffing box 15 to restrict the entrance of fluid from the tank into the stuffing box 15.

The upper end of the shaft 10 is journaled by a fixed bearing 30 adjoining the pulley 11, and an inboard bearing 31 is detachably secured at an intermediate point in the shaft 10 by a wedge 32.

When it is desired to change the wear sleeve 14, shaft 10 is raised to close valve element 16 against the seat 20 before shutting off the flow of fluid through the stuffing box from pipe 26. This operation is accomplished by the operation of jacking screws 33 acting against the housing of bearing 30 after first releasing locking nuts (not shown) associated with these screws and loosening bearing housing screws 35. After the valve element 16 has been closed, and the water shut off at pipe 26, a packing gland 34 is removed from the stuffing box 15 and the packing rings 23 and throttle bushing 25 are removed according to the usual practice for replacement of these parts.

A split slinger collar 40 can be removed by the loosening of screws 41 to permit the sleeve 14 to be threaded out of valve element 16 and to permit it to be moved axially along the shaft 10.

The inboard bearing 31 can now be removed by a well known procedure of first loosening the wedge 32 by driving the wedge upwardly, and then, by use of the slinger collar 40 that is clamped on the shaft 10 below bearing 31 and jacking screws associate therewith, after first removing a bearing retaining bracket 44. The inboard bearing parts can now be moved upwardly on the shaft 10, and the split slinger collar 40 can be removed. Most of the packing gland parts are split and can be readily removed, and others can be slid upwardly on the shaft 10 and through an opening created by the removal of the inboard bearing 31. Sleeve 14 is also moved upwardly through the bearing cavity.

The split slinger collar 40 is replaced on the shaft 10 and clamped on the shaft 10 by screws 41 in a position as shown by dotted lines so that jacking screws 43 can be removed from the collar 40 and reinserted through bores in the collar 40 and threaded into bearing bracket 47 to retain the valve element 16 closed against its seat 20 to support shaft 10 while removing outboard bearing 30.

The outboard bearing 30 can now be removed from the shaft 10 to permit inboard bearing parts and the sleeve 14 to be removed from the shaft 10, and a new sleeve 14 to be inserted on the shaft 10.

A new sleeve 14 is thus slid downwardly along the shaft 10 and threaded into the valve element 16 after following a two step procedure as described before for maintaining the valve element 16 closed against its seat 20. The stuffing box and packing can now be replaced, and the inboard and outboard bearings to provide that a new wear sleeve is replaced by operations solely effective from the upper side of flange 12. The jacking screws 33 can now be loosened from the outboard bearing 30 to permit the outboard bearing screws 35 to be tightened and this in turn permits washing fluid to be circulated from the input pipe 26 through the lower portion of the stuffing box cavity as has been described under normal conditions of operation.

Having thus described an agitator having a detachable wear sleeve as a preferred embodiment of the present invention, it is to be understood that various modifications and alterations may be made to the specific embodiment shown, without departing from the spirit or scope of the invention.

What is claimed is:

1. An agitator having a detachable wear sleeve comprising, an agitator drive shaft carrying wear sleeve means secured thereon and extending through an opening in a fixed mounting flange, having detachable stuffing box means secured to one side of the flange opening and axially operable normally open valve means secured to the agitator drive shaft on the other side of the flange opening, having an axially movable element for at times sealing said opening, said element being rotated by the agitator drive shaft, and being operable to a closed position by axial movement of the agitator drive shaft for sealing the opening in the flange when the stuffing box means is detached therefrom, wherein improved replacement means is provided for the wear sleeve means comprising;

(a) the valve means having an axially operable valve element secured on the agitator drive shaft at a point on said other side of the flange and having internal threads to detachably secure one end of the wear sleeve means to the axially operable valve element, whereby the wear sleeve means is rotated with the agitator drive shaft to prevent wear of the agitator drive shaft by the sleeve, and (b) the wear sleeve means being a single integral longitudinal sleeve on the agitator drive shaft extending through said opening in the flange and through the stuffing box and having external threads at one end thereof for detachably securing the wear sleeve means to the axially operable valve element, whereby the sleeve means can be detached from the agitator drive shaft for replacement solely by operations from said one side of the flange with the valve means closed to prevent flow of fluid from said other side of the flange through the flange opening, without requiring removal of the shaft from the opening in the flange.

2. An agitator according to claim 1 wherein the internal and external threads are left hand threads to automatically tighten upon the right hand rotation of the shaft.

3. An agitator according to claim 2 wherein the threads are of the acme type to facilitate detachment of the sleeve means from the valve element.

4. An agitator according to claim 1 or claim 3, wherein the valve element has a recessed upper portion that fits within a bore of a valve seat when the valve means is closed to provide an inboard support for the shaft while the wear sleeve is being replaced.

* * * * *